Sept. 18, 1956 B. J. WARMAN 2,763,723

AUTOMATIC TELEPHONE SYSTEMS

Filed Dec. 23, 1953 2 Sheets-Sheet 1

Inventor
BLOOMFIELD JAMES WARMAN
By H. S. Hendry
Attorney

Sept. 18, 1956 B. J. WARMAN 2,763,723

AUTOMATIC TELEPHONE SYSTEMS

Filed Dec. 23, 1953 2 Sheets-Sheet 2

Inventor
BLOOMFIELD JAMES WARMAN
By H. G. Hendry
Attorney

United States Patent Office 2,763,723

Patented Sept. 18, 1956

2,763,723

AUTOMATIC TELEPHONE SYSTEMS

Bloomfield James Warman, Blackheath, London, England, assignor to Siemens Brothers & Co. Limited, London, England, a British company Application December 23, 1953, Serial No. 399,966

Claims priority, application Great Britain December 29, 1952

7 Claims. (Cl. 179—18)

Figure 1:
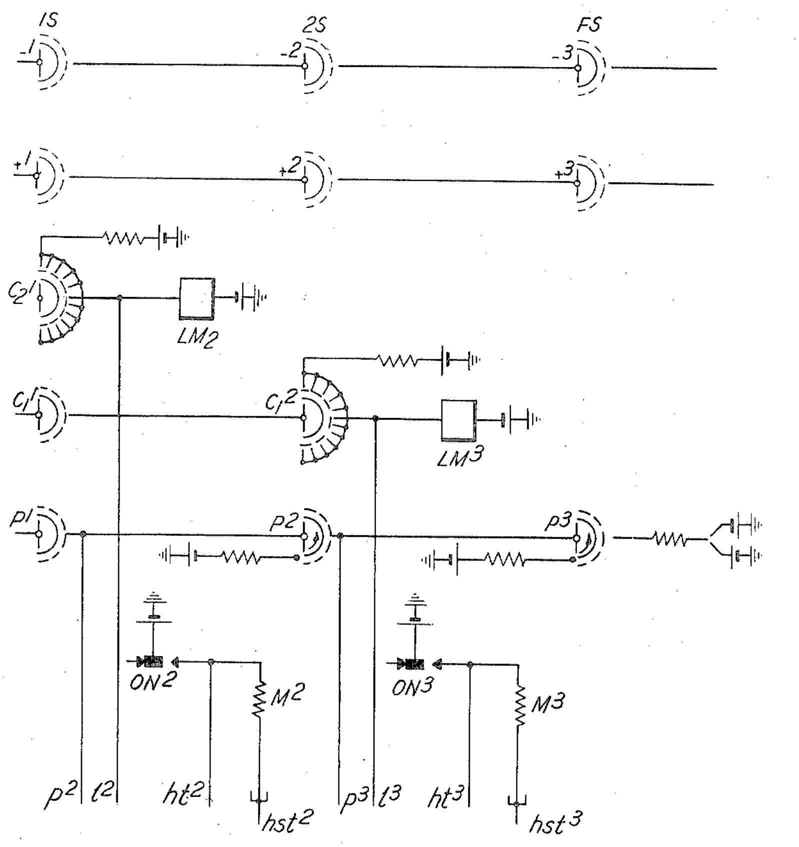

This invention relates to automatic telephone systems and has in view the provision of improved circuit arrangements for automatic selecting switches.

The arrangements of the present invention are such that the amount of apparatus required in each of a plurality of individual selecting switches is reduced by arranging that apparatus in a circuit common to a plurality of selecting switches serves to restore the switches concerned to normal after use.

According to one feature of the invention, apparatus common to a plurality of selecting switches is provided for homing the several selecting switches after use in which the common apparatus comprises an access switch, or the equivalent thereof, having outlets to each of the individual selecting switches, and is arranged so that from time to time as requisite the access switch is caused to connect with all of these outlets in turn and one or more tests are made of the condition of each outlet and when the tests or tests indicate that the selecting switch concerned is off-normal but not in use controlling action is performed by the apparatus to bring about the homing of the selecting switch. The circuits of the selecting switches are so arranged that the potential condition of a wire from the access switch to a selecting switch is different when the selecting switch is off-normal and in use from that when the switch is off-normal and not in use or is at normal. It may be arranged that the potential of one wire between the access switch and a selecting switch determines whether the switch is off-normal or not and that the normal engaged potential condition of the system is applied to another wire between the access switch and the selecting switch when the latter is in use. The potential condition of an engaged outlet may not be the same, for example it may be a unidirectional potential condition on the said other wire or an alternating (tone) potential condition.

According to another feature of the invention the interval between two successive cycles of operation of the access switch depends on the number of selecting switches of the plurality served by the common homing circuit that are off-normal the interval decreasing as the said number increases. In carrying out this feature it may be arranged that each of the selecting switches of the plurality upon leaving its normal or home position connects one pole of battery over a resistance individual to the selecting switch to a timing circuit over a start wire and that in each interval between successive cycles of operation of the access switch a timing condenser in the apparatus of the common homing circuit becomes charged over the start wire and as many individual resistances as are connected up by off-normal selecting switches, the initiation of the cycle of operation of the access switch taking place when the voltage across the condenser attains a predetermined value.

A specific embodiment of the invention as applied to the homing of second and final selecting switches will now be described by way of example with reference to the accompanying drawings.

Figure 2:
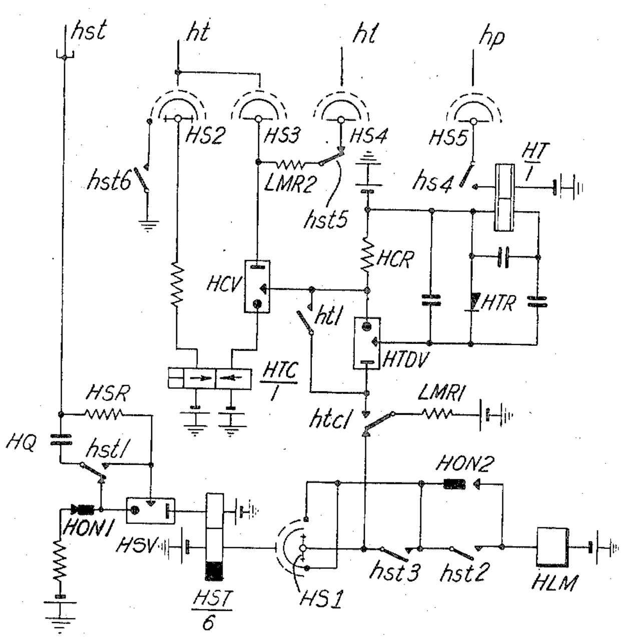

The drawings, which comprise Figs. 1 and 2, show in Fig. 1 a second selector 2S and a final selector FS, access to the second selector being had over a first selector 1S, only the wipers and banks of which are shown, which is connected to a feeding bridge and is associated with a control circuit for the setting up of a connection over the first, second and final selectors. Fig. 2 shows a homing circuit common to a number of second and final selectors for the restoration to normal of these selectors after use.

The selecting switches are of the latch-controlled motor driven type, each selector having an individual electric motor and latch magnet, and their operation is controlled on the revertive impulse principle. The control circuit which is taken into use temporarily for the setting up of a connection is available in common to a number of first selector and bridge circuits and includes digit registers adapted to be set by impulses and further operated to a complementary position by control pulses reverted from the selectors. Each selector has positive and negative line wipers and banks and a private wiper and bank and in addition first selectors have two control wipers and banks and second selectors have one control wiper and bank. In each first selector one of the control banks has outlets connected to the latch magnets of second selectors, the outlets being grouped, and prior to each group of outlets is a control contact over which a revertive control pulse from a positive battery is transmitted to the appropriate register in the control circuit. The outlets from the other control bank in positions corresponding to outlets to second selectors are connected to the control wipers of the second selectors the banks of which are connected to the latch magnets of final selectors and to control contacts in a similar manner to those of the first selectors. In each final selector the revertive pulses are transmitted over the private bank and wiper and private wire circuit to the registers registering the tens and units digits and the revertive pulses are transmitted as currents of alternate positive and negative polarity in each contact position of the selector. Busy lines are marked by the application of a tone in the bridge circuit to the private wire bank contact either over the private wire in the case of an outgoing call or over a wiper and bank of the line finder in an incoming call. The test for the free condition of a selector is by battery potential over the normal contact in the private bank of the selector, the potential in the case of the second selector being negative and in the case of the final selector being positive, the test relay being arranged to test for these polarities alternately after a selector switching operation has been performed. The latch magnet of each selector and the private wire of each selector have a connection to the homing circuit. Also, in each selector circuit, off-normal contacts of the selecting switch connect positive battery to two wires to the homing circuit, one of the connections including a high resistance connected in a start circuit and the other wire being connectable to a high speed test relay in the homing circuit. There are no relays or relay contacts in the circuits of the selecting switches, the line wire circuit being controlled from the bridge circuit which will include the usual impulse receiving and answering supervisory relays ringing relay and switching relay. The first selector is homed in the usual manner.

The homing circuit includes a motor driven access switch capable of access to 102 group and final selectors, starting and test relays and three cold cathode gas filled triodes. It also includes a timing condenser which is charged over the high resistance connected in the start circuit above referred to for determining the number of selecting switches that are off-normal.

The circuit arrangements will now be described in greater detail. The wipers of the first selector are designated $+^1$, $-^1$, $C_2^1$, $C_1^1$ and $P^1$ for the two line wipers, control wipers and private wiper respectively. The corresponding wipers of the second selector are similarly designated with the index 2 and those of the final selector with the index 3. The two line wires and the private wire are extended through by the selectors to the line circuit without the intervention of relay contacts. The bank of the control wiper $C_2^1$ has grouped outlets associated with links to second selectors connected to negative battery over the latch magnets $LM^2$ of those selectors and contacts preceding each group of outlets connected to positive battery over a resistance. The bank of the control wiper $C_1^1$ is connected to wipers $C_1^2$ of the second selectors and the bank of wiper $C_1^2$ of a second selector has grouped outlets associated with links to final selectors connected to negative battery over the latch magnets $LM^3$ of those selectors, and contacts preceding each group of outlets connected to positive battery over a resistance. The normal contact in the private wire bank of the second selector is connected to negative battery over a resistance and the normal contact in the private wire bank of the final selector is connected to positive battery over a resistance and the contacts in the private wire banks corresponding to outlets from the first and second selectors are connected through to the second and final selectors respectively and the contacts in the private wire bank of the final selector are connected alternately to negative and positive battery over high resistances. It should here be remarked that the order of connection of lines to the banks of the selectors is in reverse order as regards the direction of rotation and that the final selector is set in one movement after the tens and units digits have been registered. Off-normal contacts of the second and final selectors are designated $ON^2$ and $ON^3$ respectively, the moving members being connected to positive battery and the members to which they are brought into contact when the selectors leave their normal positions are connected over very high resistances $M^2$ and $M^3$ to wires $hst^2$ and $hst^3$ respectively.

Connections from these latter members are also made to wires *ht*2 and *ht*3 connected in banks of the access switch of the common homing circuit. The latch magnets $LM^2$ and $LM^3$ are also connected to wires $l^2$ and $l^3$ connected in a bank of the access switch and the private wires in the second and final selectors are connected to wires $p^2$ and $p^3$ connected to another bank of the access switch. It is to be understood that the line and private wipers of the first selector are connected to the bridge circuit and that the private and control wipers of this selector are coupled to a control circuit including digit registers when the selector is taken into use. The method of setting the selectors is briefly as follows. A control circuit including digit registers is coupled to the bridge circuit and first selector and the digits for the setting up of a connection are registered. When the first digit has been registered a circuit is closed for the latch magnet (not shown) of the first selector and the selector is driven. At each contact to which positive battery is connected to the bank of control wiper $C_2^1$ a pulse is reverted and the register is stepped once, stepping of the register taking place each time a contact connected to positive battery in the bank of wiper $C_2^1$ is encountered until the register is counted out, that is until the last register is operated. When this takes place a relay is operated which transfers the control of the latch magnet of the selector to a high speed test relay connected to operate to negative battery over the private wire. The selector continues in motion until a free second selector, in which negative battery will be connected over the normal contact and wiper $P^2$, is found whereupon the high speed test relay will operate and lock up temporarily and connect earth to the private wire to busy the outlet and open the circuit of the latch magnet. During the pause following receipt in the register of the digit for settling the first selector and up to the time of the complete receipt of the next digit the first selector has time to complete its search and when the digit for setting the second selector has been reecived the test relay is released and its circuit is changed to enable it to respond to positive battery potential connected over the normal contact and wiper $P^3$ of the final selector. At the moment the test relay is released the circuit for driving the second selector is closed and this selector is set in a similar manner, and the circuit of the test relay having been changed, that relay tests for the presence of positive potential over the normal contact and private wiper $P^3$ of the final selector in the selected group. When the ends and units digits have been registered in the register the latch magnet of the final selector is energised and that selector is driven until the contacts of the wanted line are reached, the tens and units digit registers being counted out by alternate negative and positive pulses reverted over the private wire, the revertive impulse circuit of the register being changed over from the control wire connected to wiper $C_2^1$ to the wire connected to wiper $C_1^1$ after the setting of the first selector and from the wire connected to wiper $C_1^1$ to the wire connected to wiper $P^1$ after the setting of the second selector. Consequent on the counting out of the register in setting the final selector ringing current is connected to the line wires and the calling of the wanted subscriber and the transmission of the answering supervisory signal proceeds in the normal manner. If a group selector finds all the outlets of a desired group busy it will continue in rotation and on the reversion of a further pulse, means responsive to this pulse will open the latch magnet circuit and bring about circuit changes resulting in the transmission of a busy signal to the caller. If a final selector finds the called line busy, a tone potential will be present on the private bank contact and a tone detecting transformer connected to the private wire in the control circuit will repeat the tone signal to means for preventing application of ringing current and for bringing about the transmission of a busy signal to the caller. When a call over a set up connection is terminated the first selector is restored to normal in the usual manner but the second and final selectors remain with their wipers standing on the contacts over which the connection was set up, or, if a busy condition had been encountered, on the contacts on which they were stopped. Their off-normal contacts will be in the operated condition in which positive battery potential will be applied to wires $hst^2$ and $hst^3$ over the high resistances $M^2$ and $M^3$ and directly to wires $ht^2$ and $ht^3$. It is to be understood that wires $p^2$, $l^2$, $ht^2$ and $hst^2$ and wires $p^3$, $l^3$, $ht^3$ and $hst^3$ are connected to the wires *hp, hl, ht* and *hst* respectively in the common circuit shown in Fig. 2.

It is to be understood that although 100-outlet selectors are shown by way of example in the drawing the invention may be applied to selectors of the 200-outlet type employing wiper switching. In such a case the test-in-battery would be connected to the normal contact of that private wire bank the wiper of which is connected up with the wiper switching relay unoperated and that the wiper switching relay may be operated in known manner in response to a signal denoting a particular one of a pair of digital values appropriate to the selector concerned, the signal being transmitted to the relay over one of the line wires at the time the selector is seized. The wiper switching relay when operated locks up as usual and changes the connections from one set of wipers to the other. A connection from the wiper switching relay over an additional wire to the common homing circuit would be provided and the operations bringing about the restoration to normal of the selector when it is no longer in use would also be arranged to release the wiper switching relay.

Consideration will now be given to the common homing circuit shown in Fig. 2 of the drawings. The access switch has five pairs of staggered wipers designated HS1—HS5 giving access to 102 outlets to second and final selectors for homing purposes. Of these wipers HS1 is a homing wiper, wipers HS2 and HS3 are test wipers, wiper HS4 is a wiper in a driving circuit for the latch magnets of the selectors which the circuit is arranged to home and wiper HS5 is a tone test wiper. The latch magnet for the control of the motor is designated HLM and off-normal contacts are designated HON1 and HON2. Of the relays, HST is the start relay, HTC is a high speed test relay and HT is a slow acting test relay. Relay HST is slow to release and relay HTC is a high speed relay. HSV, HCV and HTDV are three-electrode gas filled cold cathode tubes, HSV being a starting tube, HCV a control tube and HTDV a tone detecting tube. HQ is a condenser in the starting circuit. The positive and negative batteries are of 50 volts each. In the normal condition of the circuit none of the valves is conductive and none of the relays is operated and the access switch rests with its wipers on the normal contacts and contact HON1 is closed and contact HON2 is open. The holding winding of relay HST is connected to all the 102 outlet contacts but not to the normal and the last contacts in the bank of wiper HS1. When a selector is driven from normal, positive battery over its off-normal contacts is connected to wire *hst* over the high resistance $M^2$ or $M^3$ as the case may be, condenser HQ, back contact *hst1*, closed off-normal contact HON1, resistance to negative battery and earth. Each selector as it is driven from its normal position extends positive potential over the associated high resistance to wire *hst* and the rate of charge of condenser HQ is thereby increased, the rate of charge therefore being a measure of the number of selectors associated with the common homing circuit that are off-normal. During the charging of condenser HQ the control electrode of tube HSV becomes increasingly more positive with respect to the cathode by reason of the potential drop across the resistance HSR until when a predetermined potential difference exists the tube fires in series with the operating winding of relay HST. The start relay operates and at contact *hst2* closes a circuit from earth, a positive battery, resistance LMR1, back contact *htc1*, wiper HS1 and normal bank contact, contact *hst2*, latch magnet HLM, negative battery to earth. The latch magnet operates and starts the motor driving the access switch. As soon as the switch wipers leave their normal position the above traced circuit for magnet HLM is interrupted but as contacts HON2 will now be closed the magnet will remain energised over contacts *hst3* and HON2 in parallel with contact *hst2*. Positive battery over contact *htc1* will hold relay HST energised over its holding winding and wiper HS1. Contact *hst1* closes a discharge circuit for condenser HQ over resistance HSR and, contact HON1 now being open, tube HSV is extinguished. Contact *hst4* connects one winding of relay HT to wiper HS5, contact *hst5* disconnects wiper HS4 and contact *hst6* earths the last contact in the bank of wiper HS2. The access switch continues in rotation until contacts connected to a selector that is off-normal are reached whereupon, positive battery being connected to wire *ht*, relay HTC is energised over wiper HS2 and operates its sole contact *htc1*. Contact *htc1* on changing over disconnects magnet HLM, opens the holding circuit of relay HST and connects positive battery to the anode of tube HTDV. The access switch stops. If a selector encountered is in use in a connection in process of being set up earth will be present on wire *hp* in the bank of wiper HS5, while if a selector encountered is in use on an existing connection busy tone potential will be present on wire *hp*. If earth is present on wire *hp* relay HT will operate before relay HST releases and at its sole contact *ht1* will apply to the control electrode of tube HCV a potential derived from a potentiometer connection of positive and negative batteries over resistances LMR1 and HCR and contacts *htc1* and *ht1* which is sufficiently positive to cause tube HCV to strike and the higher resistance winding of relay HTC is energised in series with the tube HCV to positive battery on wire *ht*. Under this condition relay HTC is differential and is released. If instead of earth on wire *hp* tone potential is present relay HT will act as a transformer and a suitable potential will appear across the rectifier HTR which will cause tube HTDV to strike and the consequent potential drop across resistance HCR will cause tube HCV to strike and release relay HTC by differential action as above described. In each case release of relay HTC takes place during the slow releasing period of relay HST so that when contact *htc1* falls back, tube HCV and tube HTDV if operated are extinguished. Magnet HLM is re-operated and the access switch is driven until another set of contacts connected to a selector that is off-normal is encountered whereupon a similar test is made. When a selector is encountered that is off-normal and is not in use relay HTC will be operated as before but as neither earth nor tone potential will be present on wire *hp* relay HT will not be operated nor act as a transformer and neither tube HCV nor tube HTDV will strike. Consequently relay HTC will remain energised beyond the release period of relay HST and the latter relay will release. The access switch will be stopped by the operation of relay HTC. Contact *hst5* connects wiper HS3 to wiper HS4 over resistance LMR2 and positive battery over the off-normal contacts of the selector concerned will be connected over wire *ht*, these two wipers and wire *hl* to the negative battery-connected latch magnet of that selector. This magnet operates and the selector is driven to its normal position whereupon the circuit of the magnet is opened at the selector off-normal contacts and the selector is brought to rest in its normal position in which the test-in battery is connected to the private wire over the normal contact in the bank of the private wiper. The opening of the selector off-normal contacts releases relay HTC and removes a start condition from wire *hst* and contact *htc1* falling back, relay HST is operated over its holding winding and wiper HS1. The circuit of magnet HLM is re-closed and the access switch drives until contacts connected to another selector that is off-normal are encountered or the last contacts are reached. The operations previously described are performed, relay HTC being operated over wiper HS2 and contact *hst6* to earth when the last contacts on the access switch are reached. In this case ultimate release of relay HST will release relay HTC at contact *hst6* and the magnet HLM will be re-energised to step the access switch to its normal position, the magnet circuit being over contact *htc1*, wiper HS1 and last contact and contacts HON2. When the normal contacts are reached, contacts HON2 are opened and the latch magnet is de-energised. Contacts HON1 close and with relay HST unoperated the charging circuit of condenser HQ is again prepared.

If any selector, the homing of which is controlled by the common homing circuit, is of the kind having two sets of wipers and banks, one set of which is connected up by the operation of a wiper switching relay and the other is connected up without the operation of this relay, an additional connection from the selector may be extended to the homing circuit and include therein an earthed break contact of the start relay HST and a make contact of relay HTC, the connection in the selector circuit being made to the battery side of the wiper switching relay so that when the selector is released the wiper switching relay will be short circuited.

What is claimed is:

1. An automatic telephone system including a plurality of selecting switches without individual homing means, apparatus common to said plurality of selecting switches for homing them after use said apparatus comprising an access device with outlets connected to the several switches of the said plurality, means operative from time to time for positioning the access device on said outlets in turn, means for testing the condition of the selecting switch connected to an outlet on which the access device is positioned and further means under the control of said testing means for holding said access device to an outlet connected to a selecting switch that is off-normal and not in use and for closing a homing circuit for said selecting switch.

2. An automatic telephone system including a plurality of selecting switches without individual homing means, apparatus common to said plurality of selecting switches for homing them after use said apparatus comprising an access switch with outlets connected to the several selecting switches of the said plurality means for driving the access switch in cycles to make contact with said outlets in turn, means dependent on the number of selecting switches of the said plurality that are off-normal for determining the interval between two successive driving cycles of the access switch, means for testing the condition of the selecting switch connected to an outlet on which the access switch is positioned and further means under the control of said testing means for holding said access switch to an outlet connected to a selecting switch that is off-normal and not in use and for closing a homing circuit for said selecting switch.

3. An automatic telephone system according to claim 2 in which the common apparatus includes a timing device connected in common to all the selecting switches of said plurality, means in each selecting switch for applying a potential to said timing device to initiate a timing operation operated when the selecting switch moves from its normal position and means operative at the end of an interval timed by said timing device to start the access switch to traverse its said outlets.

4. An automatic telephone system according to claim 3 in which the timing device includes a condenser-resistance combination and a cold cathode electric discharge tube, a triggering circuit for said tube including an outlet wire common to said plurality of selecting switches, an off-normal contact and a resistance individual to each selecting switch connected between a source of potential and said common outlet wire, operation of a predetermined number of said off-normal contacts raising the potential over said triggering circuit to a value to trigger the tube, a start relay connected in the anode-cathode circuit of said tube and a make contact of the start relay connected in the driving circuit for the access switch.

5. An automatic telephone system according to claim 2 including in said common apparatus a slow releasing start relay, a further testing means connected to a second test wire of an outlet, a holding circuit for said start relay including a break contact operated by said further testing means, a wiper and contact bank of the access switch and off-normal contacts in said bank, a make contact of the start relay connected in a driving circuit for the access switch and means in a selecting switch for applying operative potential to said second test wire when said selecting switch is off-normal and means in the common apparatus operative by the testing means for testing the condition of a selecting switch for releasing said further testing means during the release period of the start relay if the selecting switch connected to an outlet under test is in use.

6. An automatic telephone system according to claim 5 in which said further testing means includes a differential relay one winding of which is connected directly to said second test wire and the other winding of which is connected to the same second test wire the latter connection including the anode-cathode circuit of a cold cathode electric discharge tube, a triggering circuit for said tube including means operated by the testing means for testing the condition of a selecting switch and means in a selecting switch for applying to said second test wire a potential signifying an off-normal condition of said selecting switch for the operation of the differential relay, triggering of the said tube connecting said other winding of the differential relay to said second test wire to release the relay.

7. An automatic telephone system according to claim 5 in which said further testing means includes a differential relay one winding of which is connected directly to said second test wire and the other winding of which is connected to the same test wire the latter connection including the anode-cathode circuit of a first cold cathode electric discharge tube, a triggering circuit for said tube including a second cold cathode electric discharge tube, said testing means for testing the condition of a selecting switch comprising a transformer, means in a circuit to which a selecting switch has been set for applying tone current to the primary winding of the transformer and means connected to the secondary winding of the transformer for deriving a steady potential and applying it to the triggering circuit of said second tube.

No references cited.